(No Model.)
W. G. ARBUCKLE.
OIL FILTER.
No. 590,535. Patented Sept. 21, 1897.
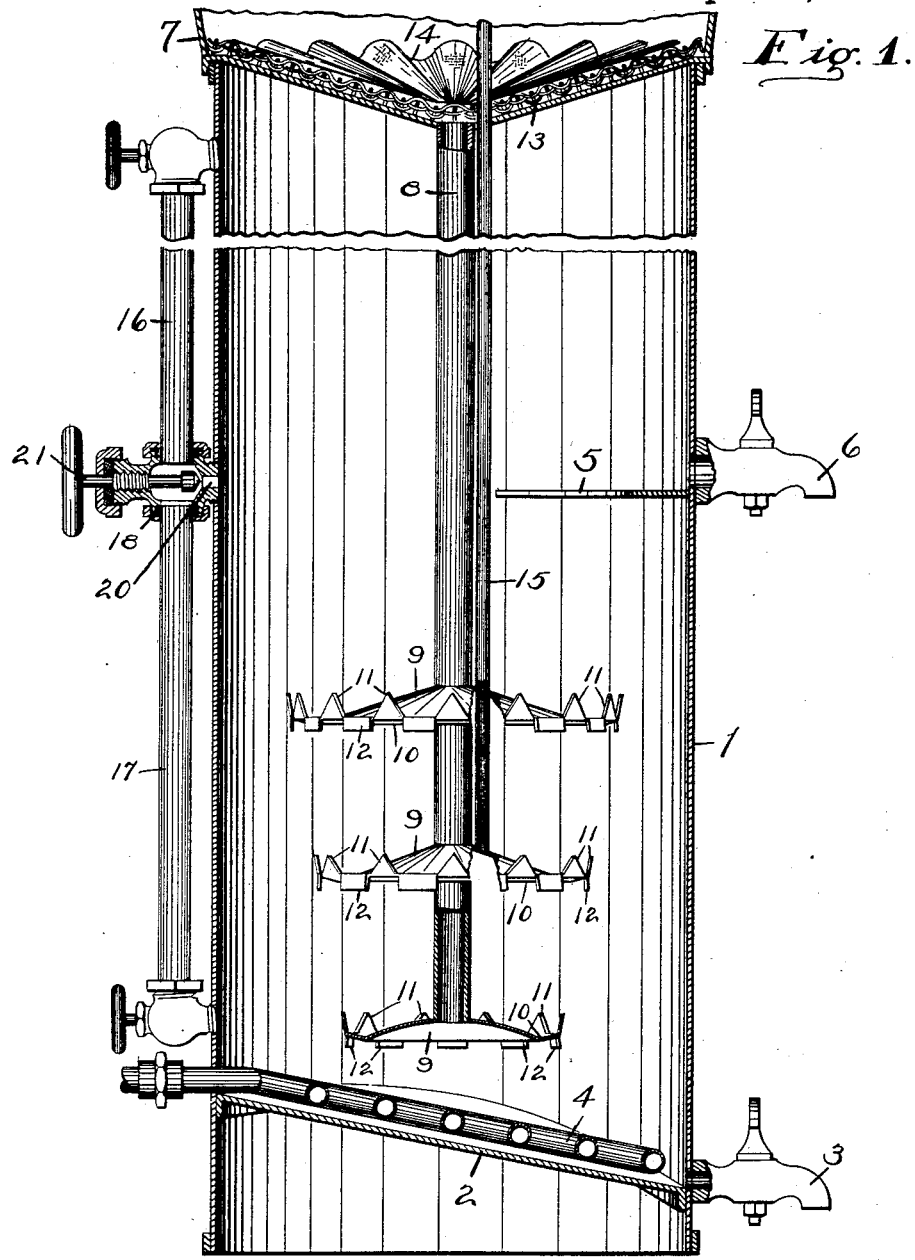
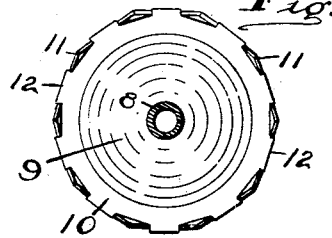
Witnesses.
G. Willard Rich.
Grace A Roda.
Inventor.
William G Arbuckle
Attorneys
THE NORRIS PETERS CO., PHOTO-LITHO., WASHINGTON, D. C.

UNITED STATES PATENT OFFICE.

WILLIAM G. ARBUCKLE, OF ROCHESTER, NEW YORK, ASSIGNOR OF ONE-HALF TO GEORGE W. PALMER, OF SAME PLACE.

OIL-FILTER.

SPECIFICATION forming part of Letters Patent No. 590,535, dated September 21, 1897.

Application filed March 27, 1897. Serial No. 629,584. (No model.)

*To all whom it may concern:*

Be it known that I, WILLIAM G. ARBUCKLE, of Rochester, in the county of Monroe and State of New York, have invented certain new and useful Improvements in Oil-Filters; and I do hereby declare the following to be a full, clear, and exact description of the same, reference being had to the accompanying drawings, forming a part of this specification, and to the reference-numerals marked thereon.

My present invention relates to oil-filters or washing apparatus of that class wherein the oil is freed from its impurities by being passed through a cleansing or washing fluid of greater specific gravity than the oil, such as water; and it consists in certain improvements whereby the oil is more effectually and thoroughly cleansed and purified and may be readily drawn off from the filter for immediate use.

To this end the invention consists in certain improvements hereinafter described, the novel features being pointed out more particularly in the claims at the end of this specification.

In the drawings, Figure 1 is a vertical sectional view of a filter constructed in accordance with my invention; Fig. 2, a plan view of one of the deflectors.

Similar reference-numerals in the figures indicate similar parts.

The main containing receptacle or body of the filter 1 is preferably cylindrical and constructed of any suitable material, the bottom 2 being inclined toward one side to lead the contents of the lower portion, and particularly dirt and sediment, toward an exit-pipe controlled by a stop-cock 3. Arranged a short distance above the bottom is a steam-coil 4, serving to heat the contents of the receptacle, and more particularly the water at the bottom, to any desired degree, which may be determined by any suitable device, as a thermometer visible through an aperture covered by transparent material, such as is commonly used in various fluid-receptacles. Upon one of the sides of the receptacle and at about the level at which the water is maintained is a plate or partition 5, above which is located a cock 6 for drawing off the purified oil, which floats upon the water, this arrangement enabling the user to draw off all of the purified oil through cock 6 without drawing off any of the water, as the partition will keep the water from being drawn off with the oil flowing through the cock, (assuming the level of the water to be maintained at or slightly below the partition,) as the oil will flow over the partition readily, while the greasy condition of the latter will repel the water until its level is perceptibly above it.

The sectional plate or diaphragm 5 does not affect the level of the oil, and by drawing off the water the oil may be lowered so that all of it may be drawn off without causing any oil to pass off through the cock 6.

The oil to be cleansed must be introduced at the bottom of the receptacle and rise through the water, and I therefore provide a removable section embodying a funnel or holder 7, adapted to rest upon the edges of the receptacle 1, and a vertical tube 8, leading therefrom to the bottom of the receptacle, and upon the exterior of the tube are located several diaphragms 9, successively increasing in diameter from the bottom toward the top, the upper one being a short distance below the top of the water. These diaphragms are somewhat conical, being higher at the center than at the edges, and near their peripheries are turned upward a short distance, as at 10, while their edges are formed with a series of upwardly-turned pointed ears or projections 11, between which are located downwardly-pointing projections 12. It is desirable that these disks or diaphragms be made of sheet metal stamped into the form shown on the ground of economy.

As usual in filters of this character, the oil containing the impurities to be removed is poured into the holder or funnel 7, and in order to arrest the coarser materials I provide within the funnel a slightly-dished diaphragm 13 of wire-netting, over which is arranged a covering of cloth or similar straining material 14, as in Fig. 1, the diaphragm 13 holding the cloth above the bottom of the funnel in order that the oil may pass freely.

In using the device the receptacle 1 is filled with water or other liquid heavier than oil to about the level of the diaphragm 5, and steam is introduced in the coil to properly heat the water. The oil to be cleansed is poured in the holder 7 and passes through the strainer 13 down the tube 8 and (by reason of the height of the hydrostatic column) out beneath the lowermost diaphragm 9. Thence, being broken into small streams by the projections 12, it will flow upward through the water in the form of well-defined drops by reason of the pointed projections 11 to the under side of the next diaphragm 9 above, and thence the oil, spreading, will be formed into drops at the tips of projections 11 on second diaphragm, and in a similar manner rising in drops from the latter to the surface of the water, the purified oil being supported on the water in the receptacle 1. The heavier impurities will fall upon the inclined bottom and may be washed out through the lower cock 3. The upper portions of the diaphragms are vented through a small pipe 15, extending above the holder 7, so that the oil may collect beneath them.

In a device of this description it is essential that the oil be passed through the water in the form of drops as distinguished from small streams in order that it may be more thoroughly washed, and the construction of the diaphragms is such that drops are always formed, the sheet of oil being broken at the edge by the projections 10, and then the points of the projections 11 will constitute such a small surface for the adhesion of the oil not sufficient to overcome the tendency of the oil to assume globular form. The slight bend formed in the diaphragms at 10 directs the oil to the extreme outer edge, which is above the lowermost part of the diaphragm, and thereby prevents it from adhering to the top and following the tube instead of rising in drops.

In order that the quantity of oil and water contained in the receptacle may be readily determined, I provide double gage-tubes 16 and 17, the former for the oil and the latter for water, with their proximate ends entering a fitting 18, having a passage 20 entering the receptacle above the level of the water and adapted to be closed by a valve 21, as shown, said valve being normally open and only closed if the upper tube should be broken. While I have shown this gage at the rear of the receptacle, it may be located at the front or side, if desired.

I claim as my invention—

1. The combination with the receptacle adapted to contain two superposed fluids of different specific gravity, of a discharge-aperture at the level of the heavier fluid, and a horizontal sectional diaphragm or partition in the receptacle arranged at the lower edge of said aperture, substantially as described.

2. In an oil-filter of the class described, the combination of the receptacle, an oil-conducting tube leading to the lower portion of the receptacle, and a diaphragm beneath which the oil is introduced having the upwardly-extending pointed projections.

3. In an oil-filter of the class described, the combination with a receptacle, an oil-supplying tube opening into the lower portion of the receptacle, of a plurality of diaphragms beneath which the tube opens, the upper ones successively larger than the lower ones, and each having the upwardly-extending pointed projections.

4. The combination of the receptacle, the oil-supplying tube and the diaphragm beneath which the tube opens provided at the edge with the upwardly-extending pointed projections and the downwardly-extending projections below them.

5. The combination of the receptacle, the oil-supply tube and the diaphragm beneath which the tube opens having the upwardly-projecting edge and the projections thereon extending in opposite directions.

6. In an oil-filter of the class described, and as a means for forming the oil into drops, a plate beneath which the oil is introduced having its edge slightly elevated and provided with the projections extending in opposite directions, substantially as described.

7. In an oil-filter, the combination with the receptacle, of the vertically-extending supply-tube open at the bottom, and a dished disk thereon having at the edge alternate upwardly and downwardly extending projections, substantially as described.

8. In an oil-filter, the combination with the receptacle, of the vertically-extending supply-tube open at the bottom, a plurality of dished disks supported on said tube successively increasing in diameter from the bottom, and each having the upwardly-turned periphery provided with alternate upwardly and downwardly extending projections, substantially as described.

9. In an oil-filter, the combination with the receptacle, the oil-tube having the funnel at the top, the foraminous corrugated disk, and the cover of textile material, of a plurality of dished disks on the tube having the projections at the edge extending in opposite directions, said disks increasing in diameter successively from the bottom toward the top, substantially as described.

WILLIAM G. ARBUCKLE.

Witnesses:
F. F. CHURCH,
G. WILLARD RICH.